(12) United States Patent
Dépot

(10) Patent No.: US 7,766,202 B2
(45) Date of Patent: Aug. 3, 2010

(54) FOLDABLE CARRIER FOR A VEHICLE

(75) Inventor: Germain Dépot, St-Denis de Brompton (CA)

(73) Assignee: Sportrack Accessories Inc., Granby, Quebec (CA)

( * ) Notice: Subject to any disclaimer, the term of this patent is extended or adjusted under 35 U.S.C. 154(b) by 1222 days.

(21) Appl. No.: 11/318,555

(22) Filed: Dec. 28, 2005

(65) Prior Publication Data

US 2007/0145088 A1  Jun. 28, 2007

(51) Int. Cl.
*B60R 9/00* (2006.01)

(52) U.S. Cl. ................ 224/504; 224/519; 224/525; 224/531

(58) Field of Classification Search .......... 224/504, 224/519, 525, 531
See application file for complete search history.

(56) References Cited

U.S. PATENT DOCUMENTS

| 5,228,607 A | 7/1993 | Telsdorf |
| 5,244,133 A | 9/1993 | Abott et al. |
| 5,449,101 A | 9/1995 | Van Dusen |
| 5,489,110 A | 2/1996 | Van Dusen |
| 5,529,231 A | 6/1996 | Burgess |
| 5,615,904 A | 4/1997 | Van Dusen et al. |
| D399,480 S | 10/1998 | Brungardt et al. |
| 5,845,831 A | 12/1998 | Nusbaum et al. |
| 6,644,525 B1 * | 11/2003 | Allen et al. .............. 224/497 |
| 6,662,983 B2 | 12/2003 | Lane et al. |

\* cited by examiner

*Primary Examiner*—Nathan J Newhouse
*Assistant Examiner*—Lester L Vanterpool
(74) *Attorney, Agent, or Firm*—Ogilvy Renault LLP

(57) ABSTRACT

A carrier having a foot member, a post and a top member. The foot member has a first end and a second connecting end adapted to be detachably connected to a hitch of a vehicle. A bottom end of the post is connected to the first end of the foot member and extends upwardly therefrom in an operational position. The top member is pivotally connected to a top end of the post and is displaceable between a deployed operative position where at least a carrying portion thereof extends away from the vehicle and a collapsed inoperative position where the carrying portion and a major part of the top member are located between a longitudinal axis the post and the vehicle. Retaining means selectively retain the top member at least in the deployed position.

15 Claims, 4 Drawing Sheets

FOLDABLE CARRIER FOR A VEHICLE

BACKGROUND OF THE INVENTION

1. Field of the Invention

The present invention relates to carriers configured to be attached to vehicles, more particularly to such carriers having a collapsed or folded configuration when not in use.

2. Background Art

A variety of equipment carriers for vehicles are known in the art. A common type of such carriers is a hitch rack, which has a coupler adapted to be received in a receptacle of a hitch receiver of the vehicle normally used to receive a coupling arrangement for connection to a trailer to be pulled or pushed. Usually, the trailer hitch receiver has a tubular configuration with a rectangular cross-section and receives therein a tubular foot member of the rack which can be locked in place through various means. Such racks generally support bicycles, ski equipment, other sporting or recreational articles, or various other equipments such as, for example, wheelchairs.

A common use of such racks is for the transportation of bicycles, with the rack suspending one or more bicycles at the rear of an automotive vehicle or at the front of a large vehicle, the bicycle support structure being cantilevered from a post having a base portion thereof received within the hitch receiver on the vehicle.

Most of such known cantilevered-type hitch racks produce a relatively large overhang behind the vehicle when they are not being used to support bicycles or other equipment thereon, even those allowing a folded configuration.

SUMMARY OF INVENTION

It is therefore an aim of the present invention to provide an improved foldable carrier for a vehicle.

Therefore, in accordance with the present invention, there is provided a carrier detachably connectable to a hitch of a road vehicle and adapted to transport at least one article mounted thereto, the carrier comprising: a foot member having a first end and a second connecting end, the second connecting end being adapted to be detachably connected to the hitch, a post having a bottom end and a top end, the bottom end being connected to the first end of the foot member and extending upwardly therefrom in an operational position, a top member pivotally connected to the top end of the post and displaceable between a deployed operative position and a collapsed inoperative position, the top member having a carrying portion adapted for receiving the at least one article, the top member in the deployed operative position extending from the post with at least the carrying portion extending away from the vehicle, and the carrying portion and a major part of the top member being located between a longitudinal axis of the post and the vehicle when the top member is in the collapsed inoperative position, and retaining means for selectively retaining the top member at least in the deployed operative position.

Also in accordance with the present invention, there is provided a method of collapsing a carrier attached to a trailer hitch of a vehicle into an inoperative position, the method comprising: unlocking retaining means preventing a carrying portion of the carrier from pivoting with respect to a post of the carrier; and pivoting the carrying portion, about a pivot connecting the carrying portion to the post, upwardly and toward the vehicle until the carrying portion is disposed in a collapsed inoperative position wherein the carrying portion is located between the post and the vehicle.

Further in accordance with the present invention, there is provided a hitch rack for an automobile, the hitch rack comprising: an elongated foot member having a rear end and a front connecting end, the front connecting end being adapted to be detachably inserted into a hitch receiver of the automobile, a post having a bottom end and a top end, the bottom end being pivotally connected to the rear end of the foot member to be pivotable between an upwardly extended operational position and rearwardly pivoted position, a top member having a carrying portion adapted for carrying an article, the top member pivotally connected to the top end of the post and pivotable between an operative position where the carrying portion extends rearwardly from the post in a position adequate for carrying the article and a collapsed inoperative position where the carrying portion and a major part of the top member are located in front of a longitudinal axis of the post, first removable retaining means for retaining the post at least in the operational position, and second removable retaining means for alternately retaining the top member in the operative and inoperative positions.

BRIEF DESCRIPTION OF THE DRAWINGS

Reference will now be made to the accompanying drawings, showing by way of illustration a preferred embodiment of the present invention and in which.

DESCRIPTION OF THE PREFERRED EMBODIMENTS

Figure 1:
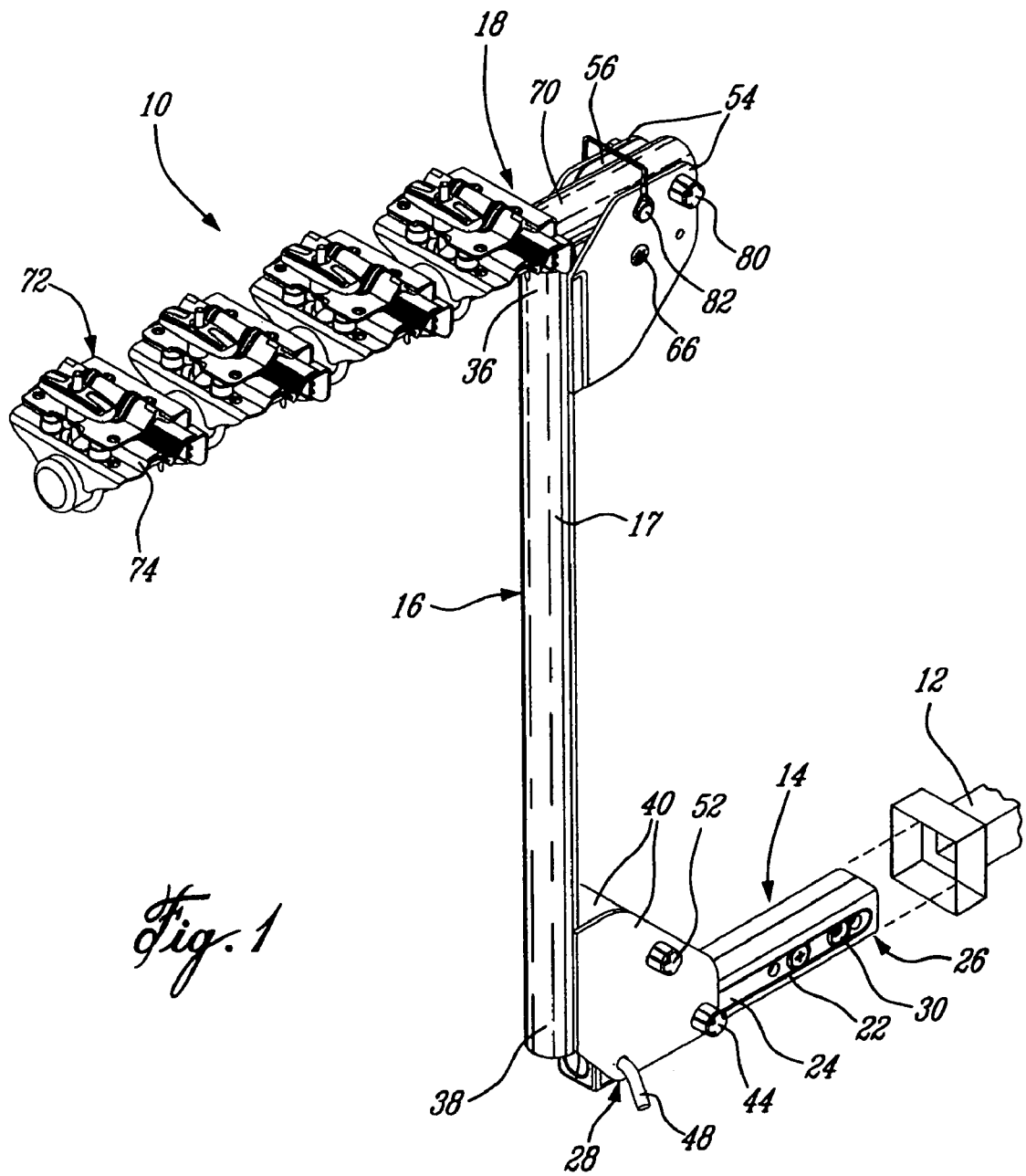
FIG. 1 is a perspective view of a carrier according to an embodiment of the present invention, shown with a post thereof in an operational position and a top member thereof in a deployed operative position.
Figure 2:
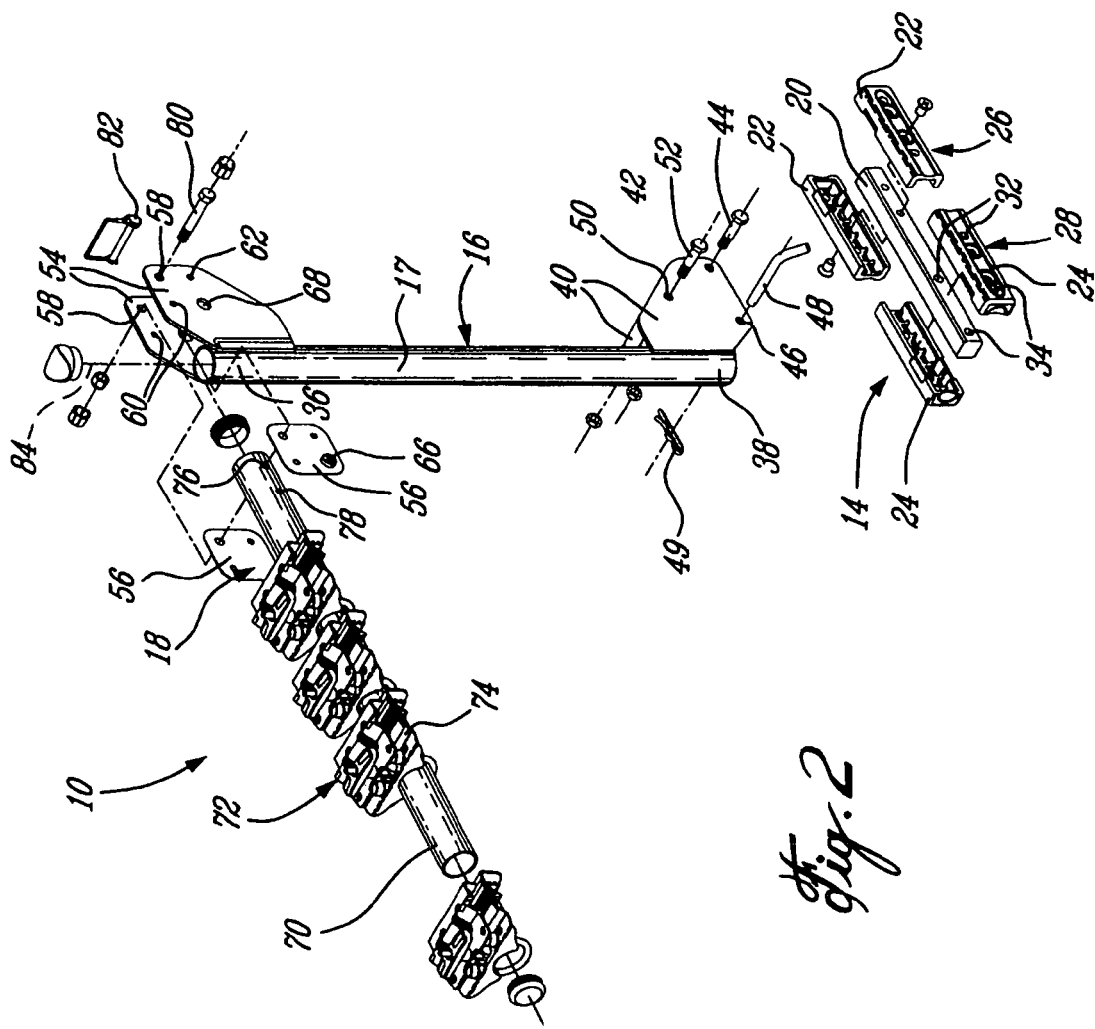
FIG. 2 is a perspective, exploded view of the carrier of FIG. 1.

Referring now to FIGS. 1 and 2, a carrier or hitch rack is generally indicated at 10. The term "carrier" will be used herein to define any device which is mountable to a vehicle and capable of supporting equipment thereon for the transportation thereof. Such a carrier will be understood to include racks used for transporting bicycles, skis and/or other equipment, particularly sporting equipment. In the preferred embodiment described below, the carrier 10 of the present invention is specifically described as a rack mountable to a rear hitch of a road vehicle, however it is to be understood that other applications remain possible. A variety of items maybe be mounted to the carrier for transportation thereof, including (but not limited to) bicycles, skis, wheelchairs, water-sports equipment, and the like. The carrier 10 is configured to be detachably mounted to a trailer hitch receiver 12 mounted to a vehicle (not shown). The carrier 10 comprises a foot member 14 to be connected to the hitch receiver 12, a post 16 extending upwardly from the foot member 14, and a top member 18 supported by the post 16. Throughout the specification and claims, the terms "front", "frontward", "frontwardly" and other related terms refer to the direction toward and/or facing the vehicle when the carrier 10 is attached thereto, while the terms "rear", "rearwardly" and related terms refer to the opposite direction, i.e. away from the vehicle. Similarly, "top", "bottom" and other similar terms refer to directions when the carrier 10 is attached to the vehicle for use.

As best seen in FIG. 2, the foot member 14 comprises a central elongated member 20 snuggly received between adjacent front and rear pairs of "C"-shaped members 22, 24. As seen in FIG. 1, the front "C"-shaped members 22 define a front connecting section 26 of the foot member 14 while the rear "C"-shaped members 24 define a rear section 28 thereof. The front connecting section 26 is sized and shaped to be received within the hitch receiver 12. The front "C"-shaped members 22 are detachable from the central member 20, and the central member 20 is sized to be received within a hitch receiver of a smaller size, such that the carrier 10 is adapted to be used with various sizes of hitch receivers. Alternatively, the front connecting section 26 can be formed of a single member adapted to be inserted into a single size of hitch receiver, or larger front "C"-shaped members 22 can be installed for receipt within larger hitch receivers.

The front connecting section 26 of the foot member 14 has a securing hole 30 defined therethrough, sized and shaped to be aligned with similar holes (not shown) defined through the walls of the hitch receiver 12 such that the two can be locked together by inserting locking means (not shown) through the aligned connecting portion and hitch receiver holes. Examples of such locking means include, for example, a pin, a padlock, etc. The rear section 28 of the foot member 14 has first and second spaced apart holes 32, 34 defined therethrough, the purpose of which will be explained further below.

Referring to FIGS. 1 and 2, the post 16, in an operational position, extends upwardly when the carrier 10 is connected to the hitch receiver 12 of the vehicle. In the embodiment shown, the post 16 includes an elongated tube 17 with an annular cross-section. The elongated post 16 defines a top end 36 and a bottom end 38. The post 16 includes a pair of bottom brackets 40 extending frontwardly from the tube 17 at the bottom end 38, substantially parallel to one another. The bottom brackets 40 have first aligned holes 42 defined therein which are aligned with the first hole 32 defined through the rear section 28 of the foot member 14. A bottom pivot bolt 44 is inserted into the aligned first holes 42, 32 to pivotally interconnect the post 16 and the foot member 14, the bottom pivot bolt 44 being frontwardly offset from a longitudinal axis 84 (see FIG. 2) of the post 16. The bottom brackets 40 also have second aligned holes 46 defined therein which, in the operational position, are aligned with the second hole 34 defined through the rear section 28 of the foot member 14. A bottom locking device shown here as a pin 48, is removably inserted into the aligned second holes 46, 34 to act as a retaining means preventing the post 16 from pivoting away from the substantially vertical operational position. Alternate locking devices include, for example, a bolt, a padlock, or a pedal or lever actuated mechanism. In the embodiment shown, a cotter pin 49 or other retention means is used to prevent the bottom pin 48 from being accidentally removed. Optionally, the bottom brackets 40 also have third aligned holes 50 defined therein to receive a bolt 52 acting as a stop, limiting the rearward rotation of the post 16 by abutting the foot member 14. Moreover, it is also possible to provide additional aligned holes in the bottom brackets 40 and/or the rear section 28 for receiving the bottom pin 48, or other retaining means, such that the post 16 can be locked in a desired one of a plurality of operational and/or pivoted positions.

The post 16 further includes a pair of top brackets 54 extend frontwardly from the tube 17 at the top end 36, substantially parallel to one another. Finish protecting plates 56, for example made of nylon, are optionally provided against the surfaces of the top brackets 54 facing one another to protect the paint finish of the top brackets 54. The top brackets 54 and plates 56 have aligned first, second and third holes 58, 60, 62 defined therein, the purpose of which will be explained further below. In the embodiment shown, the second holes 60 are vertically aligned with and horizontally spaced apart from the first holes 58 and the third holes 62 are horizontally aligned with and vertically spaced apart from the first holes 58, with a distance between the first and second holes 58, 60 being equal to a distance between the first and third holes 58, 62, the reason for which will be explained further below. The plates 56 also include a peg 66 which protrudes through a hole 68 defined in the corresponding top bracket 54 so as to prevent a movement of the plate 56 relative to its corresponding top bracket 54.

Still referring to FIGS. 1 and 2, the top member 18 comprises an elongated tubular body 70 supporting a carrying portion 72 thereon. In the deployed operative position shown in FIG. 1, the top member 18 extends substantially perpendicularly to the post 16, with at least the carrying portion 72 being located rearwardly from the post 16. Other operative positions are possible, including positions in which the top member 18 is tilted at a given angle with respect to the horizontal, examples of the given angle being 10 or 15 degrees. In the embodiment shown, the carrying portion 72 includes a plurality of individual retaining members 74, each being adapted to retain a bicycle. Alternatively, the carrying portion 72 can be configured to support a single bicycle or other types of cycling or sporting equipment, wheelchairs, tools, etc.

The tubular body 70 of the top member 18 has first and second spaced apart holes 76, 78 defined therein and located to the front of the carrying portion 72. A distance between the first and second holes 76, 78 is equal to the distance between the top brackets' first and second holes 58, 60 and to the distance between the top brackets' first and third holes 58, 62. The first hole 76 of the tubular body 70 is aligned with the first holes 58 of the top brackets 54 and a top pivot bolt 80 is inserted therethrough to pivotally interconnect the top member 18 and the post 16, the top pivot bolt 80 being frontwardly offset from the longitudinal axis 84 (see FIG. 2) of the post 16. The finish protecting plates 56, located between the top brackets 54 and the top member 18, prevents the two elements from rubbing together during the pivoting motion, thus protecting their paint finish from being damaged.

In the deployed operative position shown in FIG. 1, the second hole 78 of the tubular body 70 is aligned with the second holes 60 of the top brackets 54, and a top locking device, shown here as a pin 82, is removably inserted therethrough to act as a retaining means preventing the top member 18 from pivoting with respect to the post 16. Alternate locking devices include, for example, a bolt, a padlock, or a pedal or lever actuated mechanism.

Figure 4:
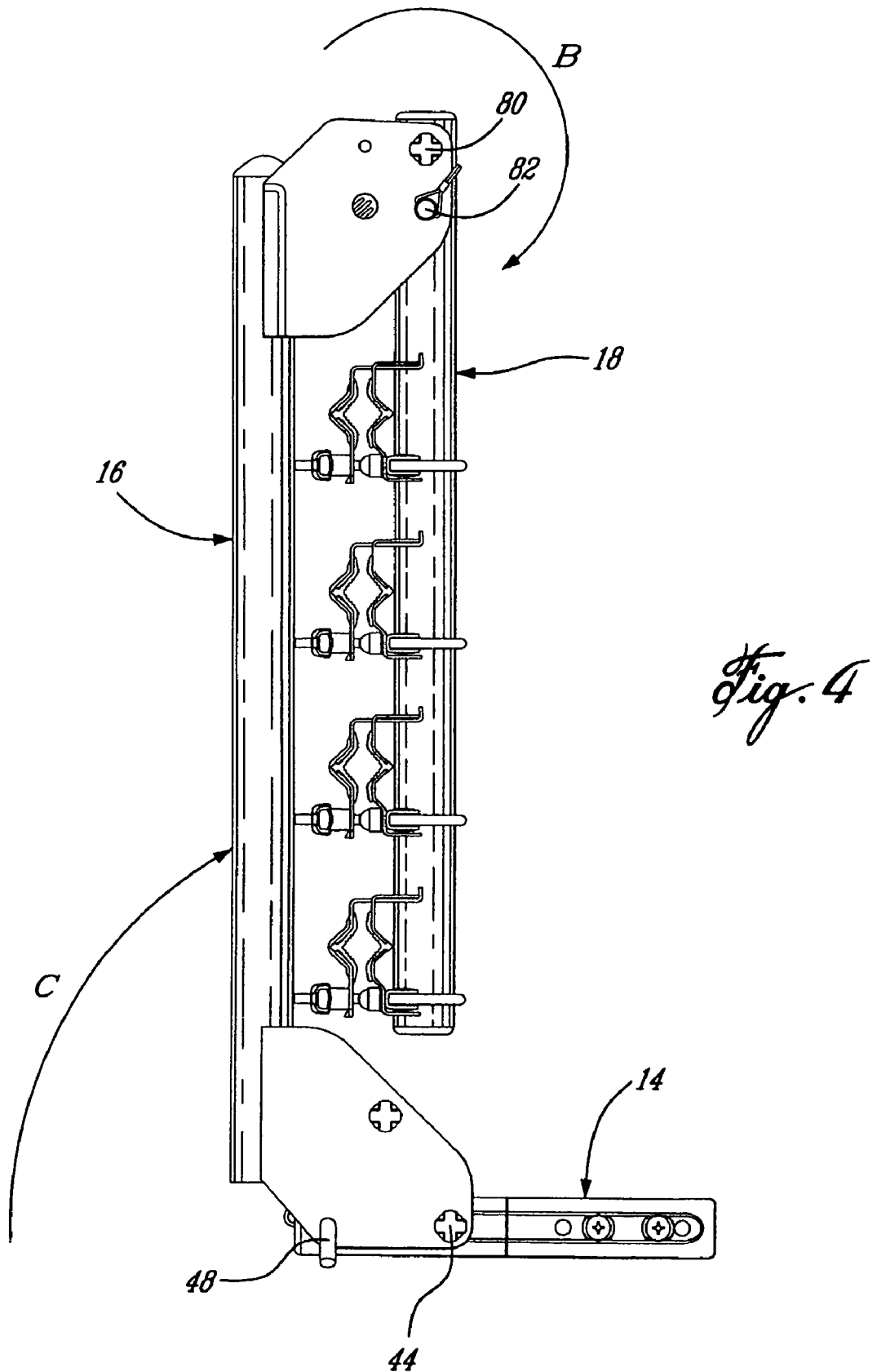
FIG. 4 is a side view of the carrier in FIG. 1, shown with the top member in a collapsed inoperative position.

In a collapsed inoperative position shown in FIG. 4, the second hole 78 of the tubular body 70 is aligned with the third holes 62 of the top brackets 54 and the top pin 82, or alternatively another pin, is inserted therethrough to act as a retaining means preventing the top member 18 from pivoting with respect to the post 16. Since in the top brackets 54 the distance between the first holes 58 receiving the pivot bolt 80 and the second holes 60 is equal to the distance between the first and third holes 58, 62, the same hole 78 in the tubular body 70 is used to be alternatively aligned with the second and third holes 60, 62 and receive the top pin 82. In cases where the distance between the first and second holes 58, 60 is different from the distance between the first and third holes 58, 62, two different holes will be required in the tubular body 70 to receive the top pin 82, i.e. one that is aligned with the second holes 60 in the operational position and one that is aligned with the third holes 62 in the collapsed position.

In the embodiment shown in FIG. 4, the top member 18 in the collapsed position is substantially parallel to the post 16, the carrying portion 72 and a major part of the top member 18 being located in front of the longitudinal axis 84 (see FIG. 2) of the post 16, with the carrying portion 72 being adjacent to and aligned with the post 16. Thus, in the embodiment shown, the top member 18 undergoes a pivoting motion of more than 180 degrees, particularly of 270 degrees, between the deployed and collapsed positions. Other collapsed positions are possible, such as the top member 18 extending in front of the post 16 at a given angle therefrom, and other operative positions are also possible, as explained above, and as such in many cases the pivoting motion will be different from 270 degrees, and can also be less than 180 degrees, when displaced between the deployed and collapsed positions. In addition, it is also possible to provide additional aligned holes in the top brackets 54 and/or the tubular body 70 for receiving the top pin 82, or other retaining means, such that the tubular body 70 can be locked in a desired one of a plurality of operative and/or collapsed positions.

Figure 3:
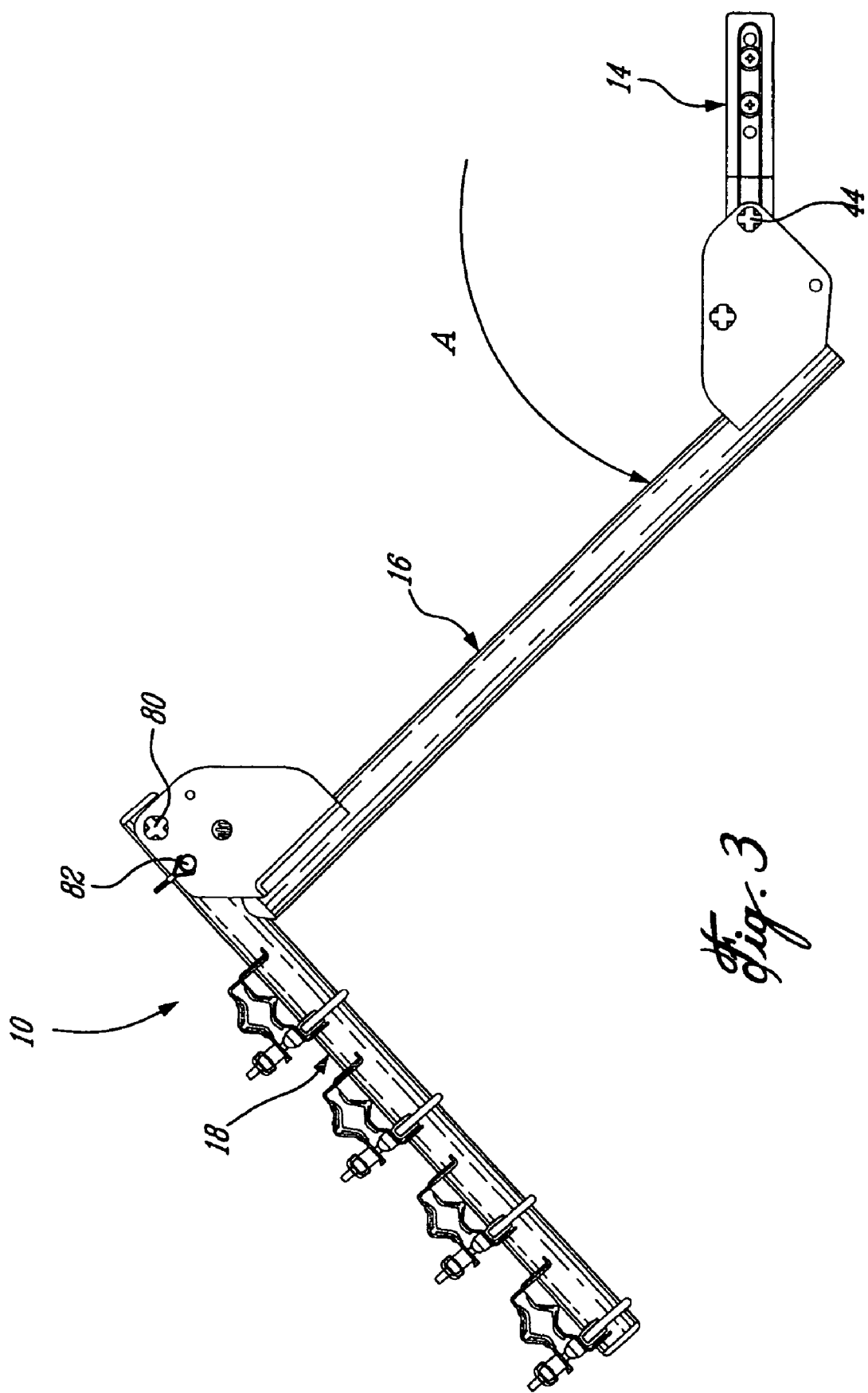
FIG. 3 is a side view of the carrier of FIG. 1, shown with the post in a pivoted position.

When the carrier 10 is not used, the overhang from the vehicle produced by the carrier 10 can be minimized by folding the carrier 10 into the collapsed position, as described below. Referring to FIG. 3, the locking device or bottom pin 48 is first removed and the post 16 is pivoted rearwardly about the bottom pivot bolt 44 to the pivoted position, i.e. away from the vehicle, as indicated by arrow A. In a particular embodiment, the post 16 is pivoted until the bolt 52 abuts the foot member 14. Then, the collapsed position shown in FIG. 4 is obtained by removing the locking device or top pin 82 and pivoting the top member 18 upwardly and frontwardly about the top pivot bolt 80, i.e. toward the vehicle as indicated by arrow B (FIG. 4), until the top pin 82 can be inserted into the aligned tubular body second hole 78 and brackets' third holes 62 to retain the top member 18 in the collapsed position. Then, the post 16 is pivoted frontwardly about the bottom pivot bolt 44 back to the operational position, i.e. toward the vehicle as indicated by arrow C (FIG. 4), and the bottom pin 48 is put back in place. Alternatively, the top pin 82 can be inserted into the aligned tubular body second hole 78 and brackets third holes 62 after the post 16 is back to the operational position. The reinsertion of the top pin 82 can also be omitted in cases when a free pivoting of the top member 18 is allowable, or an alternate retaining means is provided.

The pivoting of the post 16 thus allow a longer top member 18 to be pivoted frontward without interference from the vehicle. It is to be understood that if the top member 18 is short enough so as to be able to pivot to the collapsed position without touching the vehicle, then the post 16 does not need to be pivoted back and forth to reach the collapsed position, provided the post 16 need not be pivoted rearwardly for other purposes such as, for example, access to a trunk of the vehicle.

Since in the collapsed position no element of the carrier 10 protrudes rearwardly from the post 16, the configuration of the carrier 10 minimizes a rear overhang thereof when not in use.

In addition, the backward pivoting of the post 16 allows a user a more convenient access to a rear door of the vehicle if required.

The embodiments of the invention described above are intended to be exemplary. Those skilled in the art will therefore appreciate that the foregoing description is illustrative only, and that various alternatives and modifications can be devised without departing from the spirit of the present invention. Accordingly, the present invention is intended to embrace all such alternatives, modifications and variances which fall within the scope of the appended claims.

I claim:

1. A carrier detachably connectable to a hitch of a road vehicle and adapted to transport at least one article mounted thereto, the carrier comprising:
    a foot member having a first end and a second connecting end, the second connecting end being adapted to be detachably connected to the hitch;
    a post having a bottom end and a top end, the bottom end being connected to the first end of the foot member and extending upwardly therefrom in an operational position;
    a top member pivotally connected to the top end of the post and displaceable between a deployed operative position and a collapsed inoperative position, the top member having a carrying portion adapted for receiving the at least one article, the top member in the deployed operative position extending substantially perpendicularly from the post with at least the carrying portion extending away from the vehicle, and the carrying portion and a major part of the top member being located between a longitudinal axis of the post and the vehicle when the top member is in the collapsed inoperative position; and
    retaining means for selectively retaining the top member at least in the deployed operative position;
    wherein the top member includes a first retaining hole defined therethrough and a portion of the post includes second and third retaining holes defined therethrough, the first and second retaining holes being aligned when the top member is in the deployed operative position, the first and third retaining holes being aligned when the top member is in the collapsed inoperative position, and the retaining means include a locking device selectively insertable into the aligned first and second retaining holes and the aligned first and third retaining holes.

2. The carrier according to claim 1, wherein the carrying portion has a plurality of retaining members, the carrier is adapted to transport a plurality of the at least one article, and each of the retaining members is configured to retain at least one of the articles.

3. The carrier according to claim 1, wherein the top member is pivotally connected to the post through a pivot located between the longitudinal axis of the post and the vehicle.

4. The carrier according to claim 1, wherein the retaining means selectively and removably retain the top member in a desired one of the deployed operative position and the collapsed inoperative position.

5. The carrier according to claim 1, wherein the post is pivotally connected to the foot member and displaceable between the operational position and a pivoted position, and the carrier further comprises additional retaining means for retaining the post in the operational position.

6. The carrier according to claim 5, wherein the post is pivotally connected to the foot member through a pivot located between the longitudinal axis of the post and the vehicle.

7. The carrier according to claim 1, wherein the top member in the collapsed inoperative position is substantially parallel to the post with the carrying portion being adjacent to the post.

8. A hitch rack for an automobile, the hitch rack comprising:
    an elongated foot member having a rear end and a front connecting end, the front connecting end being adapted to be detachably inserted into a hitch receiver of the automobile;

a post having a bottom end and a top end, the bottom end being pivotally connected to the rear end of the foot member to be pivotable between an upwardly extended operational position and rearwardly pivoted position;

a top member having a carrying portion adapted for carrying an article, the top member pivotally connected to the top end of the post and pivotable between an operative position where the carrying portion extends rearwardly from the post in a position adequate for carrying the article and a collapsed inoperative position where the carrying portion and a major part of the top member are located in front of a longitudinal axis of the post;

first disengageable retaining means for retaining the post at least in the operational position; and second disengageable retaining means for alternately retaining the top member in the operative and inoperative positions;

wherein the top member includes a first retaining hole defined therethrough and a portion of the post includes second and third retaining holes defined therethrough, the first and second retaining holes being aligned when the top member is in the deployed operative position, the first and third retaining holes being aligned when the top member is in the collapsed inoperative position, and the second retaining means include a locking device alternately insertable into the aligned first and second retaining holes and the aligned first and third retaining holes.

9. The hitch rack according to claim 8, wherein the top member is pivotally connected to the post through a pivot frontwardly offset from the longitudinal axis of the post.

10. The hitch rack according to claim 8, wherein the post is pivotally connected to the foot member through a pivot frontwardly offset from the longitudinal axis of the post.

11. The hitch rack according to claim 8, wherein the top member in the collapsed inoperative position is substantially parallel to the post with the carrying portion being adjacent to the post.

12. The carrier according to claim 1, wherein the top member rotates through an angle of more than 180° when displaced between the deployed operative position and the collapsed inoperative position.

13. The carrier according to claim 12, wherein the angle is about 270°.

14. The hitch rack according to claim 8, wherein the top member rotates through an angle of more than 180° when displaced between the deployed operative position and the collapsed inoperative position.

15. The hitch rack according to claim 14, wherein the angle is about 270°.

* * * * *